United States Patent [19]

Stoner

[11] 3,988,939
[45] Nov. 2, 1976

[54] METHOD AND APPARATUS FOR CONVERTING MOTION

[75] Inventor: Jesse A. Stoner, Dekalb, Ill.

[73] Assignee: General Electric Company, Fort Wayne, Ind.

[22] Filed: Sept. 5, 1974

[21] Appl. No.: 503,389

Related U.S. Application Data

[62] Division of Ser. No. 401,177, Sept. 27, 1973, abandoned.

[52] U.S. Cl. .................................... 74/70; 74/29
[51] Int. Cl.² ........................................ F16H 21/40
[58] Field of Search ................................ 74/70, 29

[56] References Cited
UNITED STATES PATENTS

| | | | |
|---|---|---|---|
| 2,499,473 | 3/1950 | Elder | 74/76 |
| 2,844,965 | 7/1958 | Stelljes et al. | 74/70 |
| 2,971,388 | 2/1961 | Koppel | 74/70 |
| 3,459,056 | 8/1969 | Lea | 74/29 |
| 3,460,346 | 8/1969 | Branson | 74/29 |
| 3,853,014 | 12/1974 | Munzinger | 74/70 |

*Primary Examiner*—Samuel Scott
*Assistant Examiner*—Wesley S. Ratilff, Jr.
*Attorney, Agent, or Firm*—Joseph E. Papin

[57] ABSTRACT

A method of converting non-harmonic acceleration of linear reciprocal motion into generally sinusoidal acceleration. In this method, non-harmonic acceleration of the linear reciprocal motion of a driving means is transformed into complementary rotary motion, and the complementary rotary motion is translated into generally sinusoidal accelerations by conjointly moving an articulated means and drivingly interconnecting it with a linear reciprocating driven means.

Apparatus for converting non-harmonic acceleration for linear reciprocal motion into generally sinusoidal acceleration is also disclosed.

16 Claims, 4 Drawing Figures

METHOD AND APPARATUS FOR CONVERTING MOTION

RELATED APPLICATIONS

This application is a divisional of parent application Ser. No. 401,177 filed Sept. 27, 1973, (now abandoned) and continued as Ser. No. 539,038 filed Jan. 6, 1975 and the entire subject matter of the parent application and its continuation application is specifically incorporated herein by reference. This application is also related to copending application Ser. No. 397,297 filed Sept. 27, 1973, now U.S. Pat. No. 3,857,170 issued Dec. 31, 1974, and Ser. No. 397,425 filed Sept. 27, 1973.

FIELD OF THE INVENTION

The present invention relates generally to methods and apparatus for converting motion and in particular to such methods and apparatus for converting non-harmonic acceleration of linear reciprocal motion into generally sinusoidal acceleration.

BACKGROUND OF THE INVENTION

In the past, various methods and apparatus were employed to effect indexing of work-pieces, such as a dynamoelectric machine for instance, between work positions at a work station for performing various manufacturing operations on the indexed work-pieces. Past mechanical indexing apparatus for effecting a "two stop" or 180° index was usually accomplished by oscillation instead of indexing and consists of a simple rack and pinion mechanism driven by a servo motor, such as an air or hydraulic actuating cylinder or the like; however, one of the disadvantageous or undesirable features of this type of apparatus was that it produced an output movement having very poor acceleration and velocity characteristics. For instance, after the initial acceleration of the actuating cylinder during its stroke to its speed setting, the actuating cylinder thereafter operated at a constant velocity for most of the rest of its stroke, and at the end of its stroke, the actuating cylinder was stopped by an internal cushioning device and/or an external dash pot arrangement prior to the reversal of the stroke. Furthermore, it often happened that the driven load on the output shaft of the actuating cylinder was quite large in relation to the actuating cylinder size, and such out-sized load thereupon also became a driver, i.e., once it was in motion, requiring the internal cushioning device and/or external dash pot arrangement to stop not just the force of the actuating cylinder rod but the entire load being indexed which, of course, was also a disadvantageous or undesirable feature. In addition to the foregoing, another disadvantageous or undesirable feature of the past mechanical indexing apparatus was that minor variations in the driven load thereof, such as differing fixtures, part sizes, frictions, etc., resulted in irratic output motion of the actuating cylinder shaft which was especially noticeable or prevalent at the end of its stroke. Of course, efforts have been made in the past to overcome these deficiencies by increasing the size of the actuating cylinder and component parts associated therewith as well as increasing the stroke of the actuating cylinder; however, these part changes merely resulted in a rather bulky apparatus without appreciably correcting or affecting the aforementioned undesireable uniform velocity with high accelerations and decelerations of the output shaft. It may also be noted that geneva gear mechanisms are not capable of indexing an output shaft 180°.

U.S. Pat. Nos. 65,981, 595,732 and 3,459,056 each concern the conversion of non-harmonic acceleration of substantially linear reciprocal movement into generally harmonic acceleration; however, one of the disadvantageous or undesirable features thereof is that each requires dual inputs or drivers to effect the aforementioned conversion as well as a multiplicity linkages which are not only costly but also difficult to adjust and to maintain in the proper adjustment.

SUMMARY OF THE INVENTION

Among the several objects of the invention may be noted the provision of a method and apparatus for indexing a fixture having a work piece therein, such as a dynamoelectric machine at an assembly work station in an automatic assembly machine for instance, which overcomes the disadvantageous or undesirable features discussed hereinabove, as well as others, with respect to the past assembly and indexing methods and apparatus; the provision of such method and apparatus for converting non-harmonic acceleration of general linear reciprocating movement into generally sinusoidal acceleration; the provision of such method and apparatus for indexing a work-piece through about a 180° index; the provision of such method and apparatus having an output movement with exemplary acceleration and velocity characteristics; the provision of such method and apparatus having an indexing movement through about a 180° index which is relatively unaffected by the size or shape of the work-piece being indexed; the provision of such method and apparatus in which only a single input or driver is required; and the provision of such apparatus which is simplistic in design, economical to manufacture, and simply assembled. Other objects and advantageous features will be in part apparent and in part pointed out hereinafter.

In general, a method is provided in one form of the invention for converting non-harmonic acceleration of linear reciprocal motion into generally sinusoidal acceleration. In this method, non-harmonic acceleration of the linear reciprocal motion of a driving means is transformed into complementary rotary motion through a predetermined arc. The complementary rotary motion is then translated into generally sinusoidal acceleration by conjointly moving an articulated means through the predetermined arc and drivingly interconnecting it pivotally with a linearly reciprocating driven means.

Also in general, apparatus in one form of the invention is provided for converting non-harmonic acceleration of a substantially linearly reciprocally movable means into generally sinusoidal acceleration for another substantially linearly reciprocally movable means. This apparatus has means transforming the non-harmonic acceleration for the movement of the first named linearly reciprocally movable means into complementary rotary movement. Articulated means is conjointly rotatable with the transforming means and pivotally connected with the other linearly reciprocally movable means for imparting thereto the generally sinusoidal acceleration.

BRIEF DESCRIPTION OF THE DRAWINGS

Corresponding reference characters indicate corresponding parts throughout the several views of the drawing.

The following examples illustrate the invention in one form thereof and are not to be viewed as limiting the scope of the invention in any manner.

Figure 2:
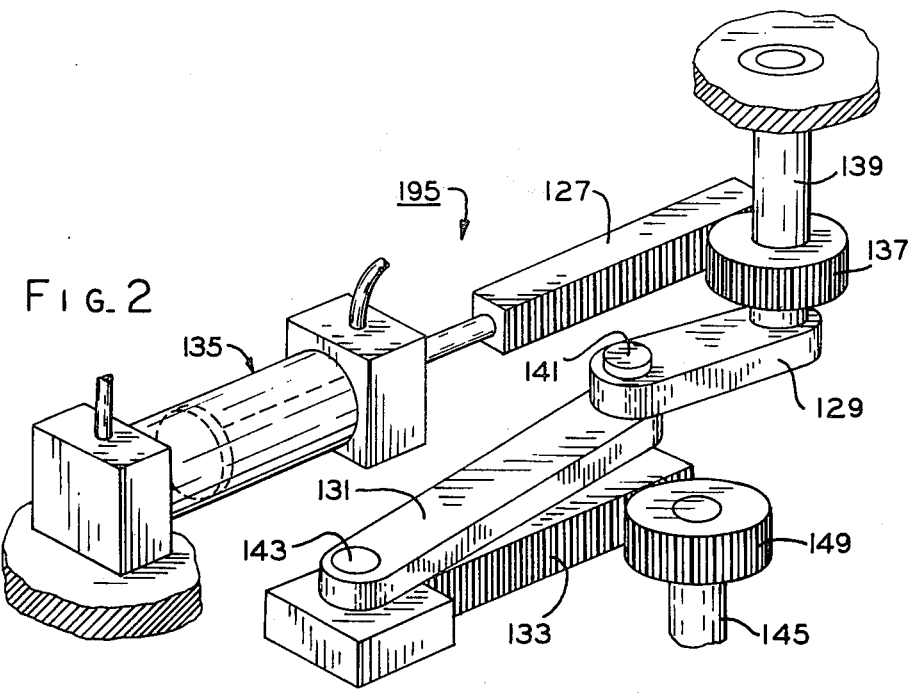
FIG. 2 is a schematic view of apparatus in one form of the invention for inverting the fixture of FIG. 1, and this apparatus may be utilized to practice principles of a method in one form of the invention for effecting the inversion of the fixture.
Figures 3, 4:
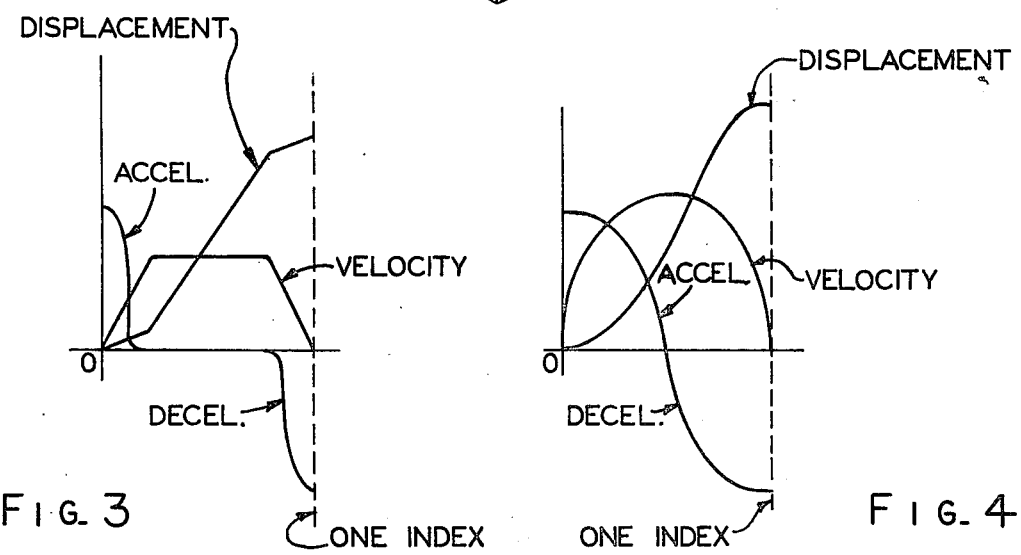
FIGS. 3 and 4 are graphical representations illustrating non-harmonic and generally sinusoidal acceleration and velocity attained by prior art apparatus and the apparatus of FIG. 2.

Referring now to the drawings in general, there is illustrated a method in one form of the invention for converting non-harmonic acceleration of linear reciprocal motion (as seen in the graphical representation of FIG. 3) into generally sinusoidal acceleration (as seen in the graphical representation of FIG. 4). This method may be practiced by transforming non-harmonic acceleration of the linear reciprocating motion of a driving means, such as a rack 127 or the like, into complementary motion through a predetermined arc. The complementary rotary motion is then translated or converted into the generally sinusoidal acceleration by conjointly moving an articulated means, such as a pair of articulated links 129, 131, through the predetermined arc and drivingly connecting it pivotally with a linear reciprocating driven means, such as another rack 133 (FIG. 2).

Figure 1:
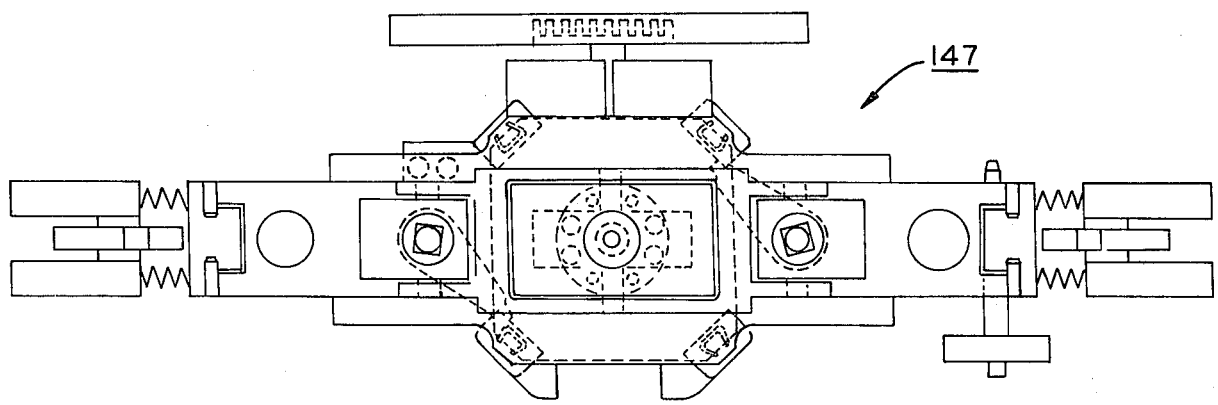
FIG. 1 is a plan view of a fixture for effecting proper alignment of dynamoelectric machine components.

More particularly, and with specific reference to FIG. 2, actuating means, such as a double-acting servo motor of the air or hydraulic type 135, is connected with rack 127 for imparting thereto reciprocal movement, and as well known in the art, acceleration of the servo motor is of the non-harmonic type, which is well known in the art as illustrated on the graphical representation of FIG. 3 and discussed hereinafter. This non-harmonic acceleration as well as the linear reciprocating motion of servo motor 135 is transmitted to rack 127 and transformed into complementary rotary motion through a predetermined arc of generally about 180° by a transforming means, such as a pinion gear 137, meshed with the rack. Articulated link 129 is on center with pinion gear 137 being connected by suitable means (not shown) with a shaft 139 of the pinion gear for concerted rotation therewith through the predetermined arc. Articulated link 131 is pivotally interconnected with articulated link 129 and rack 133 by suitable means, such as pivot pins 141, 143, respectively, and the articulation of articulated links 129, 131 in response to the rotary movement of pinion gear 137 through the predetermined arc translates the complementary non-harmonic acceleration of the rotary motion thereof into the generally sinusoidal acceleration, as illustrated in the graphical representation of FIG. 4, for effecting the substantially linearly reciprocating movement of rack 133. In this manner, the non-harmonic acceleration of the linear reciprocating motion of rack 127 is converted into generally sinusoidal acceleration for the linear reciprocating motion of rack 133. Referring now also to FIG. 1, a rotatable output shaft 145 is supported by suitable means in an automatic motor assembly machine (not shown) and connected with an invertable or rotatable fixture 147 thereof. For a more detailed discussion of the automatic motor assembly machine and its operation, reference may be had to parent application Ser. No. 401,177 (now abandoned), its continuing application Ser. No. 539,038, and copending application Ser. Nos. 397,297 (now U.S. Pat. No. 3,857,170) and 397,425 which were filed on Sept. 27, 1973 as mentioned hereinabove. Another pinion or indexing gear 149 which is meshed with rack 133 and indexed thereby through an arc equivalent to the predetermined arc, i.e. generally about 180°. In this manner, indexing of gear 137 through the predetermined arc drives or rotates fixture 147 with generally sinusoidal acceleration to an inverted position.

Referring again to the drawings in general, apparatus, indicated generally at 195 in FIG. 2, in one form of the invention is provided for converting non-harmonic acceleration of substantially linearly reciprocally movable means or rack 127 into generally sinusoidal acceleration for another substantially linearly reciprocally movable means or rack 133. Apparatus 195 has means, such as pinion gear 137, for transforming the non-harmonic acceleration of the movement of the first named linearly reciprocally movable means 127 into complimentary rotary movement, and articulated means, such as articulated linkage 129, 131 is, conjointly rotatable with the transforming means and pivotally connected with the other linearly reciprocally movable means 133 for imparting thereto the generally sinusoidal acceleration.

Apparatus 195 may provided in the automatic motor assembly machine (not shown) in driving engagement with indexing gear 149 for inverting or rotatably indexing fixture 147 between inverted positions approximately 180° apart in which work may be done on the work-piece, such as the dynamoelectric machine (not shown), disposed or chucked in the fixture.

In the operation, assume that work has been completed on the work-piece or dynamoelectric machine disposed in fixture 147 in one of the inverted positions thereof at a work station of the automatic assembly machine (not shown) wherein the components of apparatus 195 are in their respective positions, as shown in FIG. 2. At this time, servo motor 135 may be actuated, either automatically or manually, by exhausting fluid pressure from the rightward end (as seen in FIG. 2) of the servo motor and applying fluid pressure to the leftward end of the servo motor. The applied fluid pressure acts on the effective area of the servo motor piston, as shown in phantom or dashed lines in FIG. 2, thereby to establish a force for actuating apparatus 195. The established actuating force acting on the servo motor piston effects actuation of servo motor 135 to generally linearly drive rack 127 in the direction of the directional arrow shown on the rack in FIG. 2. Of course, it is apparent that rack 127 is reciprocably movable in suitable guide means, but for the sake of simplicity, such guide means are not shown. Through the engagement of the teeth of rack 127 and pinion 137, the actuating force movement of rack 127 between its "two stop" or opposite end actuating positions drivingly rotates or actuates pinion gear 137 in the direction of the rotational arrow shown thereon in FIG. 2. Of course, the association or driving engagement of rack 127 with pinion gear 137 is such that the pinion gear is rotated or indexed only through the aforementioned predetermined arc of generally about 180° in response to the reciprocal "two step" movement or opposite end actuating positions of the rack. Since the reciprocal motion imparted to rack 127 by actuation of the piston of servo motor 135 has non-harmonic acceleration, as previously noted and illustrated in FIG. 3, such non-harmonic acceleration is also imparted to the complementary rotation of pinion gear 137 through its 180° rotation or indexing.

Since articulated linkage 129 has its rightward end fixedly mounted or connected to shaft 139, the articulated linkage is conjointly rotatable with pinion gear 137 and the shaft through their respective 180° rotation or indexing. Articulated linkage 131 pivots about its pivot pins 141, 143 in response to the driving movement thereof by articulated linkage 129 and pinion gear 137 to translate to transform the rotary motion thereof into reciprocal generally linear motion of rack 133. Of course, it is apparent that rack 133 is reciprocally movable in suitable guide means, but for the sake of simplicity, such guide means are not shown. Through the meshing engagement of the teeth of rack 133 and pinion gear 149, reciprocal movement of the rack effects complementary driven rotation of the pinion gear. It may be noted that the particular connection of articulated linkages 129, 131 between gear shaft 139 and rack 133 transforms or converts the non-harmonic acceleration of the reciprocal movement of rack 127 into generally sinusoidal acceleration, as shown in the graphical representation of FIG. 4. This generally sinusoidal acceleration is imparted to the reciprocal movement of rack 133 and the rotary movement of shaft 145 and pinion gear 149.

In this manner, non-harmonic acceleration is transformed or translated to sinusoidal acceleration for smoothly inverting or rotatably indexing fixture 147 which is carried by or attached to shaft 145. It may also be noted that due to such sinusoidal acceleration of fixture 147 by apparatus 195 between the opposite indexed or inverted position of the fixture, such inversions or rotation is accomplished generally in a minimum length of time. Further, it may also be noted that the generally sinusoidal acceleration of the rotary indexing or inversion of fixture 147 compensates for any variations in the fixtures which may be employed at different times in the automatic assembly machine (not shown), and the generally sinusoidal acceleration of the fixture also is effective to compensate off-center loading of the fixtures. Due to these compensating features of the present invention, the necessity of providing expensive and bulky cushioning devices and/or dash pot arrangements for servo motor 135 is obviated, and as previously noted such prior art cushioning devices and/or dash pots were, in the most part, not particularly satisfactory.

In view of the foregoing, it is now apparent that a novel method and a novel apparatus 195 for converting non-harmonic acceleration of linear reciprocal motion into generally sinusoidal acceleration are provided by way of illustration meeting all of the objects and advantageous features set forth hereinabove, as well as others noted in the specification. Further, changes in the particular arrangements, shapes and details of components of apparatus 195, as well as variances in practicing the steps of such novel method, may be made by those having ordinary skill in the art without departing from the spirit of the invention or the scope thereof, as set out in the claims which follow.

What I claim as new and desire to secure by Letters Patent of the U.S. is:

1. A method of converting non-harmonic acceleration of linear reciprocal motion into generally sinusoidal acceleration comprising the steps of:
   a. transforming non-harmonic acceleration of the linear reciprocating motion of a driving means into complementary rotary motion through a predetermined arc of other means adapted to be driven by the driving means, said other means including a rotatably mounted shaft, and a pinion gear on the shaft; and
   b. translating the complementary rotary motion of the other means into generally sinusoidal acceleration by conjointly moving one of a pair of articulated means fixedly connected with the shaft through the predetermined arc and drivingly interconnecting the other of the articulated means pivotally with a driven means so as to move it linearly and reciprocally with the sinusoidal acceleration between a pair of indexing positions.

2. The method as set forth in claim 1, wherein the driving means includes a rack portion, and wherein the transforming step comprises rotating the gear through the predetermined arc by meshing it with the rack portion.

3. The method as set forth in claim 2, wherein the translating step comprises rotating an end of the other of the articulated means generally opposite its articulation with said one articulated means conjointly with the gear through the predetermined arc with an end of the one articulated means generally opposite its articulation with the other articulated means being drivingly interconnected pivotally with the driven means.

4. The method as set forth in claim 1, comprising the additional step of converting the generally sinusoidal acceleration of the linearly reciprocating driven means into a complementary rotary indexing motion.

5. The method as set forth in claim 4, wherein the driven means comprises a rack, and wherein the converting step comprises meshing the rack with an indexing gear for effecting complementary indexing rotation thereof.

6. Apparatus for converting non-harmonic acceleration of generally linear reciprocating motion into generally sinusoidal acceleration comprising means adapted to be movable generally linearly and reciprocally with the non-harmonic acceleration, means for transforming the non-harmonic acceleration of the linear and reciprocal movement of said movable means into complementary rotary motion, said transforming means including a shaft rotatably mounted on the apparatus, and a pinion gear on said shaft associated with said movable means, means adapted to be driven between indexing positions generally linearly and reciprocally with the sinusoidal acceleration, and a pair of articulated means, one of said articulated means being connected with said shaft so as to be conjointly rotatable therewith and the other of said articulated means being pivotally connected with said driven means for driving it generally linearly and reciprocally and imparting thereto the generally sinusoidal acceleration.

7. Apparatus as set forth in claim 6, further comprising means for converting the linear and reciprocal movement with the generally sinusoidal acceleration of said driven means into complementary rotary movement.

8. Apparatus as set forth in claim 6, wherein said movable means comprises a rack.

9. Apparatus as set forth in claim 6, wherein said articulated means respectively include a pair of opposite ends with adjacent ones of said opposite ends being articulated, and said other opposite end of said one articulated means being connected with said shaft for the conjoint rotation therewith while said other opposite end of said other articulated means is engaged in the driving pivotal connection with said driven means.

10. Apparatus as set forth in claim 6, wherein said driven means includes a rack.

11. Apparatus as set forth in claim 10, further comprising another pinion gear in driven engagement with said rack for converting its reciprocal and linear movement with generally sinusoidal acceleration into complementary rotary movement.

12. Apparatus for converting motion comprising a fluid pressure operated motor, means adapted to be generally linearly and reciprocally movable with non-harmonic acceleration in the motor in response to fluid pressure applied thereto, a first shaft mounted in the apparatus for rotation, a first pinion mounted to the first shaft for conjoint rotation therewith, a first rack connected to the movable means for conjoint movement therewith and meshed with the first pinion gear for indexing it in opposite directions and for imparting the non-harmonic acceleration thereto, a first linkage connected to the first shaft for conjoint rotation with the first pinion gear, a second rack adapted to be generally linearly and reciprocably movable, a second linkage having opposite end portions, a pair of pivot pins pivotally mounted between the first linkage and second rack and each of the opposite ends of the second linkage, respectively, the second linkage effecting an articulating interconnection between the first linkage and the second rack acting to convert the non-harmonic acceleration of the first rack and first pinion gear into generally sinusoidal acceleration of the second rack, a fixture for a work-piece adapted to be driven between a pair of indexed positions generally about 180° apart, a second shaft for rotatably mounting the fixture, and a second pinion gear mounted to the second shaft and meshed with the second rack so that both the second pinion gear and the fixture are driven by the second rack in opposite directions between the indexed positions with complementary generally sinusoidal acceleration.

13. Apparatus as set forth in claim 6, wherein said articulated means is generally constituted by a pair of articulated links, an end portion on one of said articulated links generally spaced from its articulation with said other of said articulated links and connected with said shaft so that the complementary rotary motion thereof is conjointly imparted to at least said one articulated link, and an end portion on said other articulated link generally spaced from its articulation with said one articulated link and pivotally connected in driving engagement with said other linearly reciprocally movable means.

14. Apparatus for converting non-harmonic acceleration of a linearly reciprocally movable rack into generally sinusoidal acceleration for another rack linearly reciprocally movable between a pair of indexing positions comprising a shaft rotatably mounted in said apparatus, a pinion gear on said shaft engaged with the first named rack for transforming its non-harmonic reciprocal movement into complementary rotary motion, and a pair of articulated links driven by said pinion gear for imparting the generally sinusoidal acceleration to the other rack including an end portion on one of said articulated links generally opposite its articulation with the other of said articulated links and connected with said shaft for conjoint rotation with said pinion gear, and another end portion on said other articulated link generally opposite its articulation with said one articulated link and pivotally connected in driving engagement with the other rack so as to move it linearly and reciprocally between its indexing positions.

15. A method of converting non-harmonic acceleration of a linearly reciprocally movable rack into generally sinusoidal acceleration of another rack adapted for linearly reciprocally movement between a pair of indexing positions comprising the steps of:
   a. transforming the non-harmonic acceleration of the first rack into complementary rotating movement with the non-harmonic acceleration through a pinion gear meshed therewith and mounted on a rotatable shaft; and
   b. translating the complementary rotating movement with the non-harmonic acceleration of the pinion gear into the generally sinusoidal acceleration of the other rack through an interconnection of one of a pair of articulated links with the shaft so as to be conjointly rotatable therewith and an interconnection of the other of the articulated links in pivotal engagement with the other rack so as to drive it linearly and reciprocally with the generally sinusoidal acceleration between its indexing positions.

16. The method as set forth in claim 15, comprising the additional step of converting the linear and reciprocal movement with the generally sinusoidal acceleration of the other rack into a complementary rotating indexing motion with the generally sinusoidal acceleration through another pinion gear meshed therewith for driving a fixture for a work piece.

* * * * *

UNITED STATES PATENT OFFICE
CERTIFICATE OF CORRECTION

PATENT NO. : 3,988,939
DATED : November 2, 1976
INVENTOR(S) : Jesse A. Stoner

It is certified that error appears in the above-identified patent and that said Letters Patent are hereby corrected as shown below:

Col. 1, line 7, after "1973" delete ",";
line 9, after "1975" insert --,--;
line 12, delete "application" and insert --applications--.
Col. 4, line 24, after "131" insert --,--;
line 24, after "is" delete ",";

Col. 8, line 4, delete "other linearly recipro-" and insert --driven--;
line 5, delete "cally movable".

Signed and Sealed this

Eighth Day of March 1977

[SEAL]

Attest:

RUTH C. MASON
*Attesting Officer*

C. MARSHALL DANN
*Commissioner of Patents and Trademarks*